Dec. 16, 1924.

A. V. SANTARSIERO

SAFETY COOKER

Filed Sept. 29, 1923

1,519,510

WITNESSES

Inventor
ANTONIO V. SANTARSIERO

Attorney

Patented Dec. 16, 1924.

1,519,510

UNITED STATES PATENT OFFICE.

ANTONIO V. SANTARSIERO, OF NEW YORK, N. Y.

SAFETY COOKER.

Application filed September 29, 1923. Serial No. 665,714.

*To all whom it may concern:*

Be it known that I, ANTONIO V. SANTARSIERO, a citizen of the United States, residing at New York, in the county of New York and State of New York, have invented certain new and useful Improvements in a Safety Cooker, of which the following is a specification.

This invention appertains to culinary appliances and the primary object of the invention is to provide an improved cooker, so constructed that the articles of food being cooked therein can be readily and quickly removed therefrom, without the necessity of using an extraneous strainer or colander.

Another prime object of the invention is the provision of an improved cooking vessel embodying an outer imperforate casing and an inner foraminated food receiving container, the food container having a bail handle associated therewith, so that the same can be readily and quickly removed from the outer imperforate casing when it is desired to remove the articles of food being cooked therefrom, the inner imperforate container having novel means, to which the bail is connected for spacing the same from the bottom of the outer imperforate casing, whereby the danger of the food being burnt is reduced to a minimum.

A further object of the invention is the provision of novel rods carried by the opposite sides of the foraminated inner food receiving container, which form means for bracing the container, means for spacing the container from the bottom wall of the outside casing, and means for receiving the bail handle.

A further prime object of the invention is the provision of novel means for associating a lid or cover with the improved cooking utensil, whereby the said lid or cover will be removed with the inner foraminated container, when the same is withdrawn from the outside casing, the cover forming a guard for the hand of the user of the cooking utensil, so as to effectively prevent the burning of the hand and the face of the user from the rising steam.

A still further object of the invention is the provision of a novel cooking utensil of the above character, which is so constructed that two different articles of food can be cooked therein simultaneously, the said articles of food being held in spaced relation by a suitable partition plate.

A further object of the invention is to provide novel means for detachably mounting the partition plate in place, so that the same cooker or kitchen utensil can be used for cooking a large quantity of a single article of food or for cooking two different kinds of food simultaneously.

A still further object of the invention is to provide an improved cooking utensil of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed and illustrated in the accompanying drawing, in which drawing:

Figure 1:
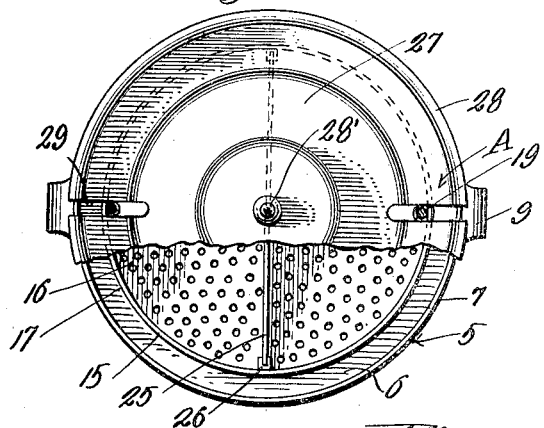
Figure 1 is a plan view of the improved cooking utensil, showing the bail in section and the cover broken away to illustrate the interior of the utensil.

Referring to the drawing in detail, wherein similar reference characters designate corresponding parts throughout the several views, the letter A generally indicates the improved cooking utensil, which comprises the outer casing or vessel 5 and the inner food receiving container 15.

The outer vessel 5 can be formed of any desired material, such as aluminum, block tin, enameled iron or the like and is of an imperforate nature, so that liquids can be heated therein.

While the vessel 5 can be of any desired size and configuration, as shown the same includes the disk-shaped bottom wall 6 and the cylindrical side wall 7. The upper edge of the side wall 7 can be bent to form a reinforcing bead 8 if so desired and this bead also eliminates the necessity of the forming of any sharp edges.

Figure 2:
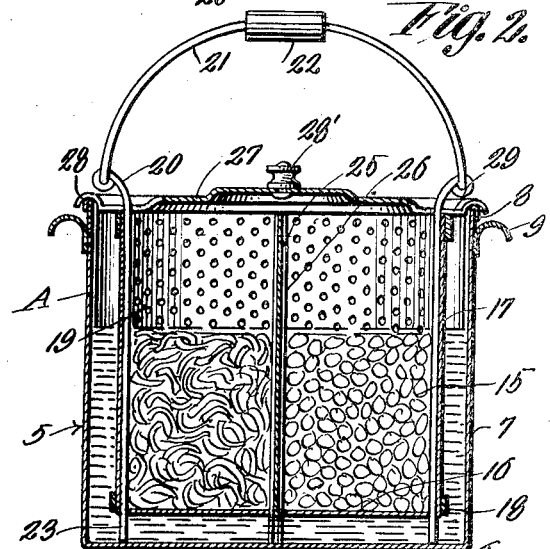
Figure 2 is a diametric vertical section through the improved cooking utensil, illustrating the utensil being used for cooking two different articles of food.
Figure 3:
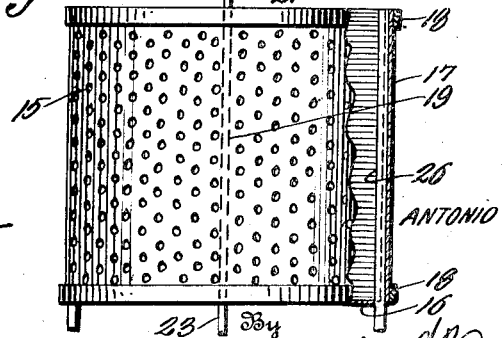
Figure 3 is a side elevation of the inner foraminated container, parts of the same being shown broken away and in section.

In order to facilitate the manipulation of the vessel 5, the same can be provided at opposite diametric points with any preferred type of handles 9, which are clearly shown in Figures 1 and 2 of the drawing.

The inner receptacle 15 is of course shaped to conform to the general configuration of the outer vessel 5 and is of a relative smaller size than the outer vessel so that the inner receptacle can be readily placed in the outer vessel in spaced relation to the side and bottom walls thereof. This food receiving container 15 is formed of foraminated material either of woven wire net, or sheet metal suitably perforated. As shown in the drawing the inner food receiving container 15 embodies the perforated bottom 16 and the cylindrical side perforated wall 17.

The container 15 can be braced in any preferred manner such as by upper and lower annular bands 18. The container can be further braced by diametrically disposed vertically extending rods 19 which can be secured to the side wall 17 in any desired way. The upper ends of the reinforcing rods 19 extend beyond the upper edge of the side wall and are bent outwardly in opposite directions and coiled to provide eyes 20 for receiving the terminals of the pivoted bail 21. This bail can be provided with any preferred type of non-heat conducting handle 22. The extreme lower ends of the rods 19 extend through the bottom 16 of the container 15 and form seats or supporting legs for holding the container 15 in spaced relation to the bottom wall 6, so that the food contained in the container will not be easily burned or scorched. It therefore can be seen that the rods 19 serve a triple function.

In order to effectively bring about the cooking of two different articles of food within the container 15, I provide a diametrically extending partition plate 25 and it is obvious that one kind of food can be placed on one side of the partition plate while another different kind of food can be placed on the other side of the partition plate and that the plate will effectively prevent the two different kinds of food from becoming mixed. In order to detachably and slidably hold the partition plate 25 in place, the inner surface of the container 15 at diametrically opposite points are provided with guideways 26 which are of a substantial U-shape in cross section. These guideways are arranged at quarters in relation to the rods 17 and they also serve as means for stiffening or bracing the container.

A cover 27 is provided for the utensil and forms means for covering both the inner container 15 and the outer vessel 5. The cover 27 at its axial center is provided with any preferred type of manipulating handle 28'. The periphery of the cover 27 is provided with an annular bead 28 for snugly engaging the upper edge of the outer vessel 5. By referring to Figures 1 and 2, it can be seen that the cover is provided at opposite diametrically disposed points with inwardly extending slots 29, which receive the flared portions 20 of the rods 19. The flared portions of the rods 19 allow the easy removal of the cover 27 and it can be seen that when it is desired to remove the cover that the handle 28' is grasped and that the cover is raised and then tilted at an angle and slipped off of said ends 20 of the rods.

Now it also can be seen that when the inner food receiving container 15 is moved from the outer vessel 5 that the cover 27 will be lifted therewith which will effectively protect the hands of the user from arising steam and the like.

The improved cooking utensil can be used for an indefinite number of cooking purposes, which will readily suggest themselves to the housekeeper, but the utensil is particularly adapted for cooking spaghetti or the like and it is obvious that when the container 15 is lifted out of the water in the vessel 5, that all of the water will drain off of the spaghetti or other articles of food being cooked and thus eliminate the necessity of the use of an extraneous strainer or colander.

The vessel can also be advantageously used for making clear soup or consommé and it can be seen that all of the vegetables, meat and the like can be placed directly within the container 15 and that after the soup has been made, the container can be removed, which will lift all of the solid matter from the soup leaving the soup in a clear condition ready for use.

The improved cooking utensil can also be effectively used for cooking two different articles of food, as heretofore stated such as spaghetti and beans, and it can be seen that the spaghetti can be placed on one side of the partition 25 and the beans on the other side. The use of the partition 25 is also advantageous when cooking ham and cabbage or the like, and it can be seen that the cabbage can be placed on one side of the partition and the ham on the other. When cooking a large quantity of one kind of food, the partition plate 25 is of course removed.

From the foregoing description, it can be seen that I have provided an improved cooking utensil of exceptionally simple and durable construction in which the articles of food can be readily removed from the cooking water with a minimum amount of effort on the part of the user of the cooking utensil and without the danger of the user of the cooking utensil being burned by steam and the like.

Changes in details may be made without departing from the spirit or the scope of this invention.

What I claim as new is:

1. A cooking utensil comprising an outer imperforated vessel, an inner foraminated vessel, vertically extending diametrically disposed bracing rods secured to the container, the lower ends of the rods extending below the lower wall of the container for engaging the lower wall of the vessel, to form supporting feet for the container, the upper ends of the rods being bent outwardly in opposite directions a sufficient distance to permit removal of the cover, and provided with eyes, a bail handle having its terminals secured to the eyes, a cover plate for the utensil having inwardly extending diametrically disposed slots formed therein for receiving said bent portions of the rods.

2. A cooking utensil comprising an outer imperforated vessel, an inner foraminated container, reinforcing rods secured to the side walls of the container at diametrically opposite points, depending supporting feet formed on the lower ends of the rods for engaging the lower wall of the vessel, vertically extending diametrically opposed guides secured to the container arranged at quarters in relation to the rods, said guides being extended to form feet, and a partition plate slidably mounted in said guides, as and for the purpose specified.

In testimony whereof I affix my signature in presence of two witnesses.

ANTONIO V. SANTARSIERO.

Witnesses:
IRVING L. McCATHRAN,
GEORGE W. WRIGHT.